(12) United States Patent
Ohara

(10) Patent No.: US 12,732,912 B2
(45) Date of Patent: Sep. 8, 2026

(54) TERMINAL FOR CONFIGURING MONITORING OF DOWNLINK CONTROL CHANNEL

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 494 days.

(21) Appl. No.: 17/906,809

(22) PCT Filed: Apr. 2, 2020

(86) PCT No.: PCT/JP2020/015251
§ 371 (c)(1),
(2) Date: Sep. 20, 2022

(87) PCT Pub. No.: WO2021/199414
PCT Pub. Date: Oct. 7, 2021

(65) Prior Publication Data

US 2023/0199651 A1 Jun. 22, 2023

(51) Int. Cl.
*H04W 52/02* (2009.01)
*H04L 5/00* (2006.01)
*H04W 76/28* (2018.01)

(52) U.S. Cl.
CPC ....... *H04W 52/0229* (2013.01); *H04L 5/0053* (2013.01); *H04W 52/0216* (2013.01); *H04W 76/28* (2018.02)

(58) Field of Classification Search
CPC ......... H04W 52/0229; H04W 52/0216; H04W 76/28; H04W 52/0235; H04L 5/0053; Y02D 30/70
See application file for complete search history.

(56) References Cited

U.S. PATENT DOCUMENTS

2019/0306737 A1 10/2019 Kwak et al.
2020/0107371 A1* 4/2020 Kunt ..................... H04L 5/0055
2021/0068159 A1* 3/2021 Wu ....................... H04W 48/12
2022/0167429 A1* 5/2022 Shen ................. H04W 74/0833

FOREIGN PATENT DOCUMENTS

CN 110582974 A 12/2019

OTHER PUBLICATIONS

PDCCH Skipping, CATT (Year: 2019).*
Office Action issued in counterpart Japanese Patent Application No. 2022-511473 mailed on May 7, 2024 (5 pages).
ZTE; "Views on power saving enhancement"; 3GPP TSG RAN WG1 #100, R1-2000513; e-Meeting; Feb. 24-Mar. 6, 2020 (12 pages).

(Continued)

*Primary Examiner* — Ayanah S George
(74) *Attorney, Agent, or Firm* — Osha Bergman Watanabe & Burton LLP

(57) ABSTRACT

A terminal includes a receiving unit configured to receive a signal in a physical layer from a base station, the signal including information related to monitoring of a control channel. The terminal includes a control unit configured to monitor the control channel transmitted from the base station. The control unit configures a period in which the control channel is not monitored, based on the information.

1 Claim, 8 Drawing Sheets

(56) References Cited

OTHER PUBLICATIONS

ZTE; "Discussion on PDCCH-based power saving signal"; 3GPP TSG RAN WG1 #98, R1-1908198; Prague, Czech Republic; Aug. 26-30, 2019 (15 pages).
Office Action issued in counterpart Chinese Patent Application No. 202080099192.X mailed on Jun. 28, 2024 (19 pages).
3GPP TSG RAN WG1 Meeting #98; R1-1908608 "PDCCH skipping" CATT; Prague, CZ; Aug. 26-30, 2019 (5 pages).
3GPP TSG RAN WG1 Meeting #99; R1-1912573 "Discussion on PDCCH-based power saving channel" Spreadtrum Communications; Reno, USA; Nov. 18-22, 2019 (15 pages).
3GPP TS 38.300 V16.0.0 "3rd Generation Partnership Project; Technical Specification Group Radio Access Network; NR; NR and NG-RAN Overall Description; Stage 2 (Release 16)" Dec. 2019 (101 pages).
International Search Report issued in International Application No. PCT/JP2020/015251, mailed Nov. 17, 2020 (3 pages).
Written Opinion issued in International Application No. PCT/JP2020/015251; Dated Nov. 17, 2020 (3 pages).
Extended European Search Report issued in counterpart European Patent Application No. 20928133.6, mailed on Dec. 12, 2023 (9 pages).
Apple Inc.; "Design of PDCCH-based Power Saving Signal and Channel"; 3GPP TSG RAN WG1 #96bis, R1-1904985; Xi'an, China; Apr. 8-12, 2019 (9 pages).
Huawei, HiSilicon; "Reduction of PDCCH monitoring for UE power saving"; 3GPP TSG RAN WG1 Meeting #97, R1-1906592; Reno, USA; May 13-17, 2019 (7 pages).
Office Action issued in Japanese Application No. 2022-511473, mailed Oct. 8, 2024 (5 pages).
Office Action issued in counterpart Chinese Patent Application No. 202080099192.X mailed on Mar. 1, 2025 (14 pages).

* cited by examiner

DL TRANSMISSION

UL TRANSMISSION

10

CELL

START
S21
IS SPECIFIC UPPER LAYER PARAMETER CONFIGURED?
YES
NO
S22
IDENTIFY SPECIFIC FIELD OF DCI AS NORMAL SCHEDULING
S23
IDENTIFY SPECIFIC FIELD OF DCI AS PDCCH SKIPPING PERIOD
END

FIG.6

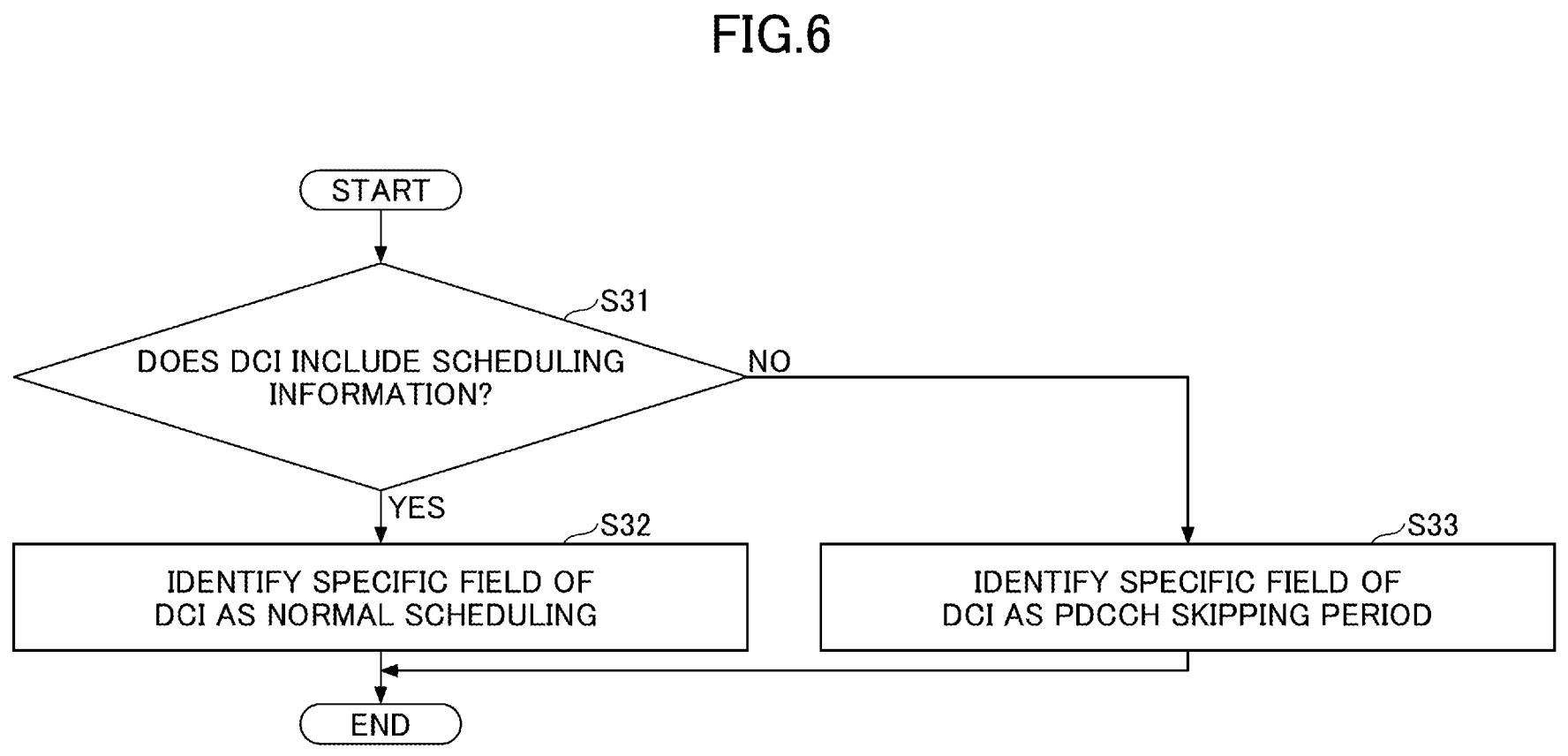

START

S31

DOES DCI INCLUDE SCHEDULING INFORMATION?

YES

NO

S32

IDENTIFY SPECIFIC FIELD OF DCI AS NORMAL SCHEDULING

S33

IDENTIFY SPECIFIC FIELD OF DCI AS PDCCH SKIPPING PERIOD

END

TERMINAL FOR CONFIGURING MONITORING OF DOWNLINK CONTROL CHANNEL

TECHNICAL FIELD

The present invention relates to a terminal and a communication method in a wireless communication system.

RELATED ART

For New Radio (NR) (also referred to as "5G") that is a successor system to Long Term Evolution (LTE), techniques that meet requirements such as large capacity systems, high data transmission rates, low delay, simultaneous connection with a large number of terminals, low cost, and power saving have been discussed (e.g., Non-Patent document 1). 5G is a mobile communication system that supports a radio frequency band such as a millimeter wave above 10 GHZ. In comparison to a conventional system such as LTE, a greatly broader frequency bandwidth in class of some hundreds of MHz is used to achieve wireless data communication at very high speed that is in several Gbps class.

In LTE and NR, when data communication of a terminal is not performed, Discontinuous Reception (DRX) can be applied in order to reduce power consumption. The DRX includes DRX in an idle state and Connected DRX (CDRX) in a connected state.

CITATION LIST

Non-Patent Document

Non-Patent document 1: 3GPP TS 38.300 V16.0.0 (2019-12)

SUMMARY OF INVENTION

Problem to be Solved by Invention

In NR, a conventional control through the CDRX is a semi-static control in a Medium Access Control (MAC) layer, and thus it is difficult to dynamically reduce PDCCH monitoring occasions.

In view of the point described above, the present invention has an object to reduce power that is consumed for monitoring of a control signal in a wireless communication system.

According to disclosed techniques, a terminal is provided including a receiving unit configured to receive, from a base station, a signal in a physical layer, the signal including information related to monitoring of a control channel. The terminal includes a control unit configured to monitor the control channel transmitted from the base station. The control unit is configured to configure a period in which the control channel is not monitored, based on the information.

Advantageous Effects of Invention

According to the disclosed techniques, in a wireless communication system, power that is consumed for monitoring of a control signal in a wireless communication system can be reduced.

BRIEF DESCRIPTION OF DRAWINGS

FIG. 1 is a diagram illustrating an example of the configuration of a wireless communication system according to an embodiment of the present invention;

FIG. 6 is a flowchart illustrating a second example of the process related to the DCI according to the embodiment of the present invention;

DESCRIPTION OF EMBODIMENTS

Figure 2:
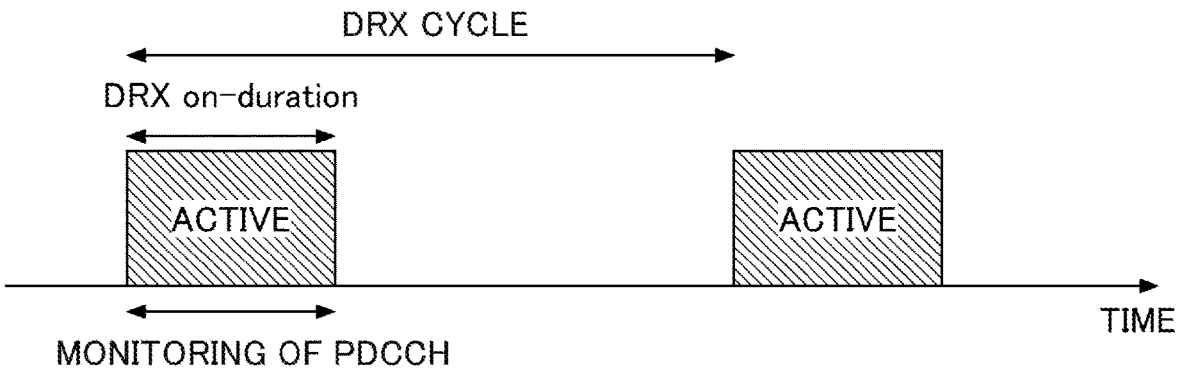
FIG. 2 is a diagram illustrating an example of DRX.

One or more embodiments of the present invention will be hereinafter described with reference to the drawings. Note that the embodiments described below are merely examples, and the embodiments to which the present invention is applied are not limited to the embodiments below.

In an operation of a wireless communication system according to one or more embodiments of the present invention, conventional techniques are used accordingly. The conventional techniques include, for example, conventional LTE, but are not limited to the conventional LTE. The term "LTE" used in this specification may broadly mean LTE-Advanced and systems (e.g., NR) used after LTE-Advanced, unless otherwise stated.

In one or more embodiments of the present invention described below, terms used in a conventional LTE, such as a synchronization signal (SS), a primary (PSS), a secondary SS (SSS), a physical broadcast channel (PBCH), a physical random access channel (PRACH), a physical uplink control channel (PUCCH), and a physical uplink shared channel (PUSCH), are used. This is for ease of description, and signals, functions, or the like that are similar to these terms may be referred to by other names. The above terms in NR respectively correspond to NR-SS, NR-PSS, NR-SSS, NR-PBCH, NR-PRACH, NR-PUCCH, NR-PUSCH, and the like. However, the signals used in NR are not necessarily expressed by "NR-".

In one or more embodiments of the present invention, a duplex system may include a time division duplex (TDD) system, a frequency division duplex (FDD) system, or other systems (e.g., flexible duplex, or the like).

In one or more embodiments of the present invention, a wireless parameter or the like is "configured", may mean that a predetermined value is "pre-configured", or may mean that a wireless parameter indicated by a base station 10 or a terminal 20 is configured.

Figure 1:
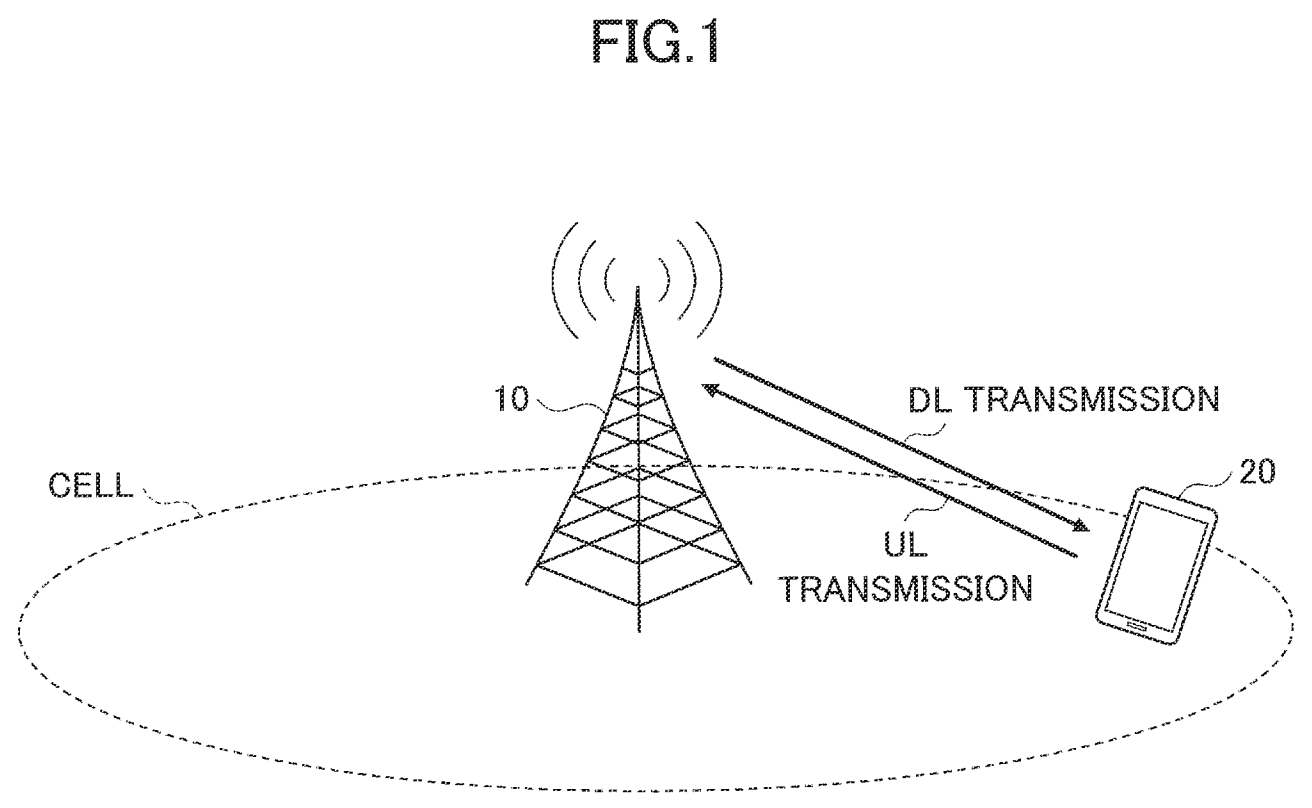

FIG. 1 is a diagram illustrating a wireless communication system according to the embodiment of the present invention. The wireless communication system according to the embodiment of the present invention includes the base station 10 and the terminal 20, as illustrated in FIG. 1. In FIG. 1, one base station 10 and one terminal 20 are each illustrated. However, this is an example and the number for each of the base station and the terminal may be plural. Note that the terminal 20 may be referred to as a "user device." The communication wireless communication system according to one or more embodiment may be also referred to as a NR-U system.

The base station 10 provides one or more cells and is a communication apparatus that wirelessly communicates with the terminal 20. A physical resource for a radio signal may be defined in a time domain and a frequency domain. The time domain may be defined by a slot or an OFDM symbol, and the frequency domain may be defined by a sub-band, a sub-carrier, or a resource block.

As illustrated in FIG. 1, the base station 10 transmits a control signal or data via downlink (DL), to the terminal 20, and receives a control signal or data via uplink (UL), from the terminal 20. Each of the base station 10 and the terminal 20 can perform beam forming to transmit and receive signals. Also, each of the base station 10 and the terminal 20 can apply multiple input multiple output (MIMO) communication to the DL or the UL. Also, each of the base station 10 and the terminal 20 may perform communication via a secondary cell (SCell) and a primary cell (PCell), through carrier aggregation (CA).

The terminal 20 is a communicating device having a wireless communication function, such as a smartphone, a mobile phone, a tablet, a wearable terminal, or a communication module for machine-to-machine (M2M). As illustrated in FIG. 1, the terminal 20 receives control signals or data with DL, from the base station 10, and transmits control signals or data with UL, to the base station 10, to thereby utilize various communication services provided by the wireless communication system.

Note that NR-dual connectivity (NR-DC) may be performed. For example, a base station 10A that is a master node (MN), and a base station 10B that is a secondary node (SN) are provided. The base station 10A and the base station 10B are each connected to a core network. The terminal 20 communicates with both of the base station 10A and the base station 10B.

A cell group that is provided by the base station 10A that is an MN is referred to as a master cell group (MCG). A cell group that is provided by the base station 10B that is an SN is referred to as a secondary cell group (SCG).

FIG. 2 is a diagram illustrating an example of DRX. As illustrated in FIG. 2, when data communication is not performed, DRX can be applied to the terminal 20 in order to reduce power consumption. As illustrated in FIG. 2, a period during which the terminal 20 is in an active state is configured by drx-OnDurationTimer, and a cycle of such an active period is specified by a DRX cycle.

Parameters related to the DRX include: the drx-OnDurationTimer described above; drx-LongCycleStartOffset for indicating an offset for a DRX cycle; drx-InactivityTimer for indicating a period of a timer, the period starting from the occurrence of traffic and ending at the transition to a sleep state; drx-ShortCycle for indicating a DRX cycle; and the like. These parameters related to the DRX are each configured regardless of a sub-carrier spacing.

One or more parameters related to the DRX are indicated to the terminal 20 by the base station 10, For example, for each cell group such as an MCG or a SCG, such parameters related to the DRX may be configured to the terminal 20, through information elements CellGroupConfing, MAC-CellGroupConfig, and DRX-Config that are included in an RRC message such as RRCReconfiguration, RRCResume, or the like.

Here, with respect to the terminal 20 in a connected mode state in NR, power consumption is greatly influenced by PDCCH monitoring in which scheduling information for the terminal 20 is not included. Thus, power consumption for the PDCCH monitoring is being discussed to be reduced.

In the conventional NR technology, as illustrated in FIG. 2, techniques such as CDRX are also applied, and thus a timing at which PDCCH monitoring is performed is restricted, thereby enabling power consumption to be reduced.

However, the conventional control through the CDRX is a control in a medium access control (MAC) layer, and is a semi-static control. For this reason, PDCCH monitoring cannot be dynamically reduced. Note that with respect to the transition to a CDRX state, a transition performed based on a timer, or a transition performed based on an indication via a control signal in a MAC layer, are available.

In NR, a shorter slot length is supported in accordance with a sub-carrier spacing, and consequently the number of times of PDCCH monitoring per a time unit, tends to be increased. Thus, PDCCH monitoring is difficult to be sufficiently reduced by the CDRX control. In particular, in FR2, the sub-carrier spacing is large and consequently the number of times of PDCCH monitoring tends to be significantly increased, as described above.

Accordingly, by using downlink control information (DCI), a period in which PDCCH monitoring can be skipped may be indicated or configured to the terminal 20.

Figure 3:
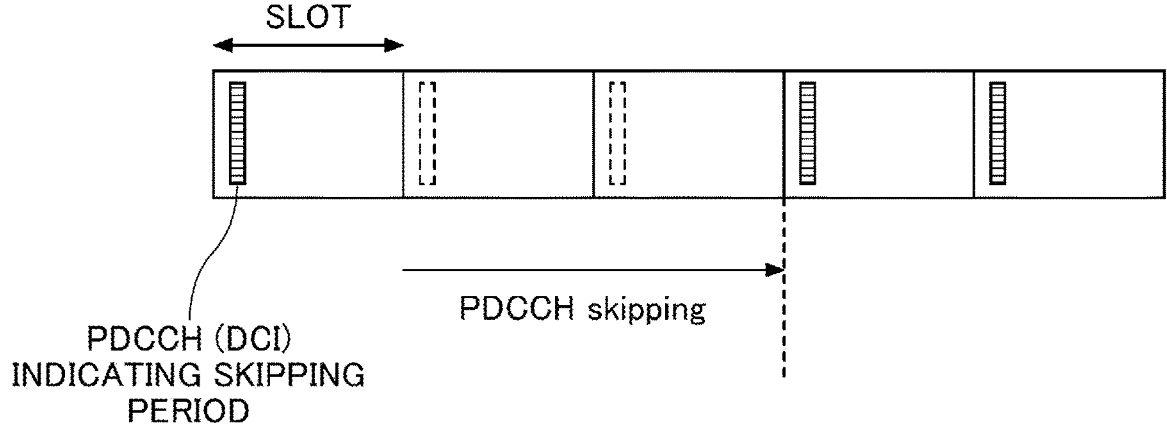
FIG. 3 is a diagram illustrating a first example of PDCCH monitoring according to the embodiment of the present invention.

FIG. 3 is a diagram illustrating a first example of the PDCCH monitoring according to the embodiment of the present invention. As illustrated in FIG. 3, by using DCI that is received via a PDCCH, a skipping period is indicated. The terminal 20 does not perform PDCCH monitoring during the skipping period. An operation of skipping the PDCCH monitoring may be performed during DRX, or may be performed during non-DRX. As illustrated in FIG. 3, normal PDCCH monitoring may be configured for each slot. Further, when the base station 10 indicates, for each slot, a skipping period of PDCCH monitoring, to the terminal 20, the terminal 20 may skip the PDCCH monitoring for each slot.

Figure 4:
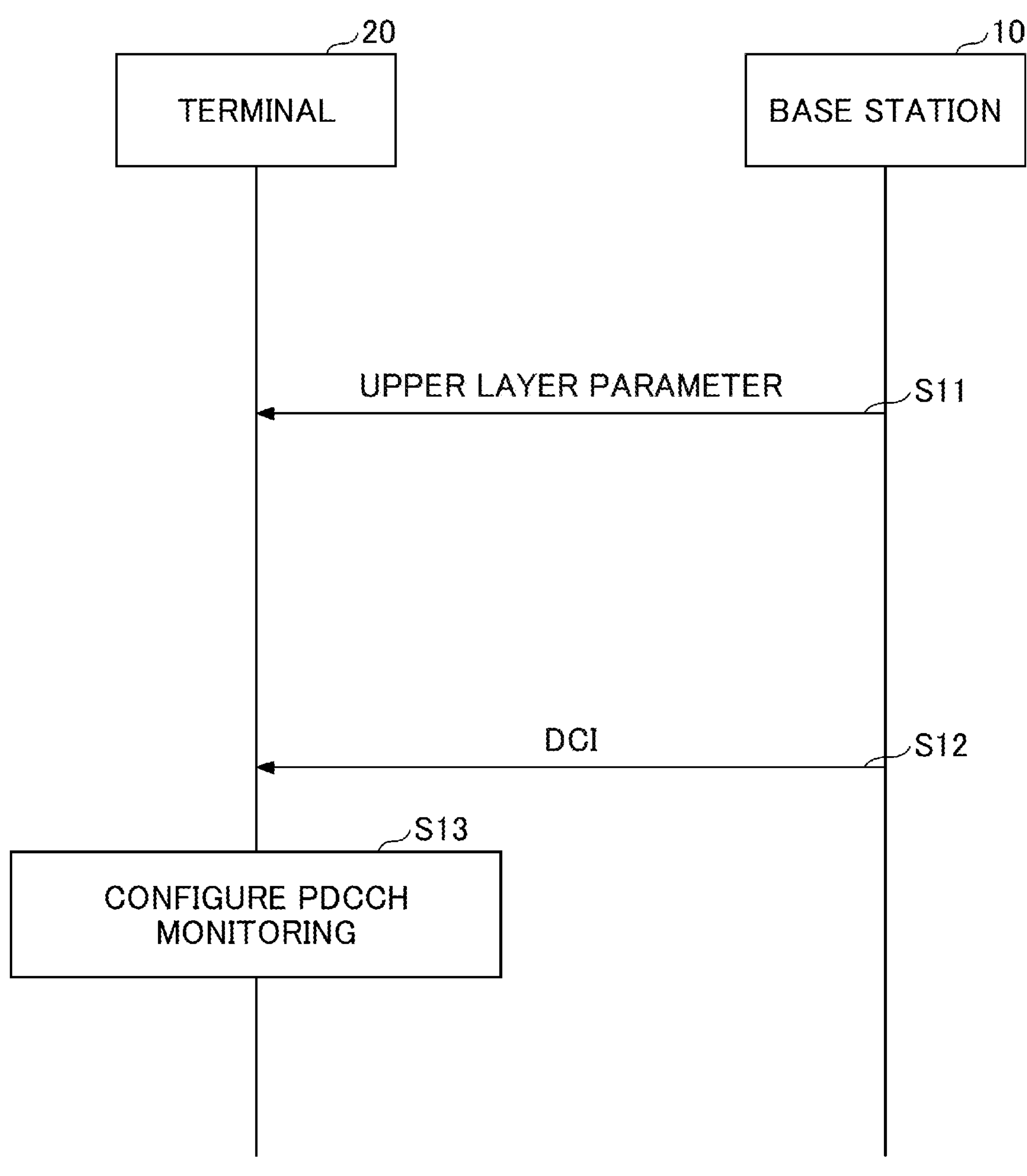
FIG. 4 is a sequence diagram illustrating the PDCCH monitoring according to the embodiment of the present invention.

FIG. 4 is a sequence for describing the PDCCH monitoring according to the embodiment of the present invention. In step S11, the base station 10 transmits an upper layer parameter to the terminal 20. For example, the upper layer parameter may be a parameter of an RRC layer. In step S12, the base station 10 transmits, to the terminal 20, DCI including information indicating a period in which PDCCH monitoring can be skipped. Then, the terminal 20 performs configuration of not performing PDCCH monitoring during the indicated period in which PDCCH monitoring can be skipped (S13). Note that step S11 may be performed or need not be performed according to the necessity.

For example, the terminal 20 may select a value from among multiple values that are preconfigured by an upper layer parameter, according to the DCI, and may obtain information indicating a period in which PDCCH monitoring can be skipped. For example, 1 slot and 4 slots are configured by an upper layer parameter, 1 slot may be indicated by a bit value 0 in a DCI field, and 4 slots may be indicated by a bit value 1 in the DCI field. In another example, 0 slots and 2 slots are configured by the upper layer parameter, 0 slots may be indicated by the bit value 0 in the DCI field, and 2 slots may be indicated by the bit value 1 in the DCI field.

For example, a period in which PDCCH monitoring can be skipped and which is predefined by technical specifications, may be indicated to the terminal 20 via DCI. For example, such a period in which the PDCCH monitoring can be skipped and which is predefined by technical specifications, may be specified in a slot unit, for example, 0 slots, 1 slot, 2 slots, 3 slots, or the like may be specified. Alternatively, the period described above may be specified by 0 slots, as well as by a slot unit that is determined by a power of two, for example, 0 slots, 1 slot, 2 slots, 4 slots, or the like may be specified. Alternatively, the above period may be specified by a slot unit that is determined by a multiple of two, for example, 0 slots, 2 slots, 4 slots, 6 slots, or the like may be specified. Note that one or more slot numbers among the slot numbers as specified above need not be specified. For example, 0 slots need not be specified.

The terminal 20 may skip DCI in accordance with a radio network temporary identifier (RNTI) type. Skipping of the DCI may mean skipping of PDCCH monitoring corresponding to only a RNTI to be skipped. Alternatively, the skipping of the DCI may mean skipping of PDCCH decoding corresponding to a RNTI to be skipped when PDCCH monitoring corresponding to both of the RNTI to be skipped and a RNTI not to be skipped is performed. For example, when a period in which DCI can be skipped is indicated, the terminal 20 may skip only DCI corresponding to a cell-RNTI (C-RNTI) in the indicated period, or may skip DCI corresponding to all RNTIs in the indicated period. Also, the RNTI type of which corresponding DCI is to be skipped, may be predefined by technical specifications, or may be indicated to the terminal 20.

An RNTI type of which corresponding DCI is not to be skipped, may be defined as an exception by technical specifications, or may be indicated to the terminal 20 by the base station 10. For example, when the period in which DCI can be skipped is indicated, it may be defined or indicated to the terminal 20 that the terminal does not skip DCI corresponding to an RA-RNTI (random access-RNTI, or may be another RNTI type) in the indicated period. In other words, it may be defined or indicated that the terminal 20 is to monitor a PDCCH corresponding to the RA-RNTI.

With respect to the field "Minimum applicable scheduling offset indicator" included in the DCI, by switching the meaning in accordance with a condition, the period in which PDCCH can be skipped may be indicated to the terminal 20 by the base station 10.

Note that "Minimum applicable scheduling offset indicator" is information to be used in cross slot scheduling, and specifies an allowable minimum offset between the scheduling DCI and the scheduled PDSCH. For example, the minimum offset may be configured by a slot unit.

When the upper layer parameter (for example, RRC layer parameter) of "minimumSchedulingOffset" is configured, it is determined whether a predetermined minimum offset is applied to each of DL-bandwidth part (BWP) and UL-BWP, based on one bit in the field "Minimum applicable scheduling offset indicator" included in the DCI.

Figure 5:
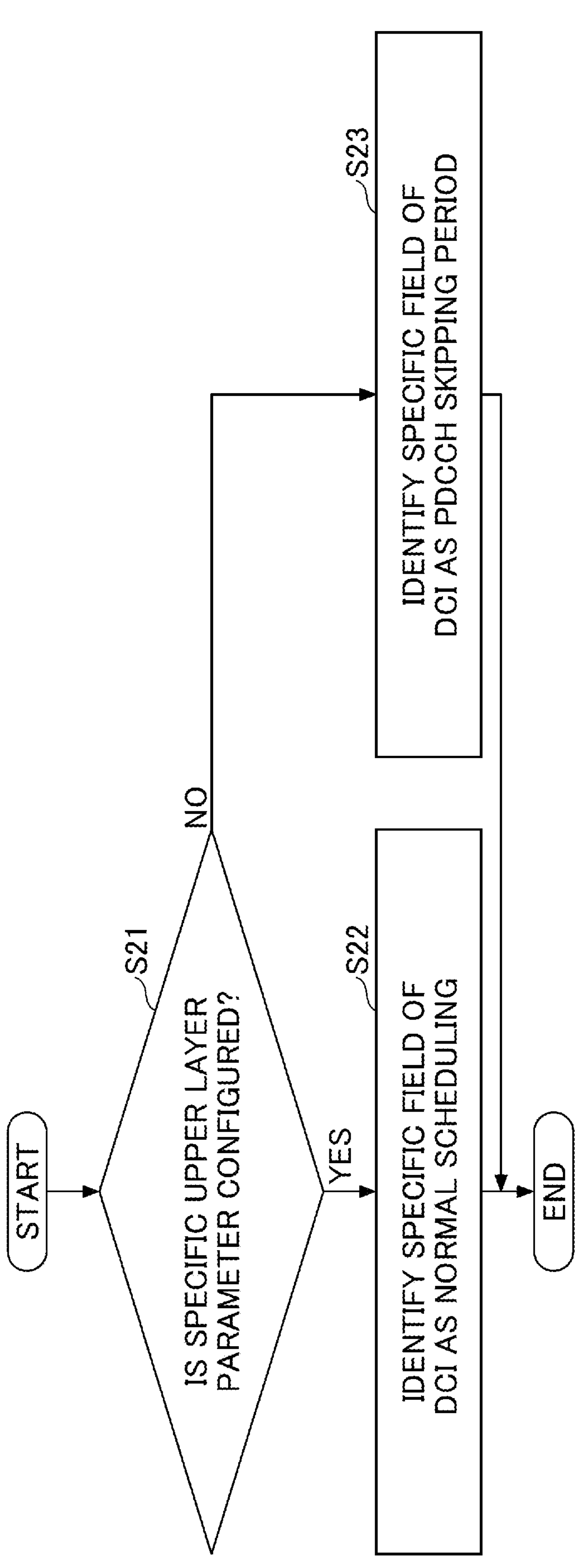
FIG. 5 is a flowchart illustrating a first example of the process related to DCI according to the embodiment of the present invention.

FIG. 5 is a flowchart illustrating a first example of the process related to the DCI according to the embodiment of the present invention. In step S21, the terminal 20 determines whether a specific upper layer parameter is configured. For example, the specific upper layer parameter may be the parameter "minimumSchedulingOffset" of an RRC layer, or may be configured to the terminal 10 by the base station 10. In a case where at least one specific upper layer parameter is configured (YES in S21), the process proceeds to step S22. In a case where any specific upper layer parameter is not configured (NO in S21), the process proceeds to step S23.

In step S22, the terminal 20 identifies the specific field in the DCI as normal scheduling. The specific field in the DCI may be "Minimum applicable scheduling offset indicator". In contrast, in step S23, the terminal 20 identifies the specific field in the DCI as a period in which PDCCH monitoring can be skipped. In other words, in step S23, the period in which PDCCH monitoring can be skipped may be indicated to the terminal 20 via "Minimum applicable scheduling offset indicator".

Further, for example, the terminal 20 may recognize, from one bit value of "Minimum applicable scheduling offset indicator" included in DCI, that a period in which PDCCH monitoring can be skipped is indicated by a corresponding value, by using a parameter shown by 1) to 3) below.

1) A parameter for indicating a period in which PDCCH monitoring can be skipped may be indicated to the terminal 20 by the base station 10, via an RRC layer, a MAC layer, or the like. For example, one or more parameters are indicated to the terminal 20 via the RRC layer, the MAC layer, or the like, and the terminal 20 may use a corresponding parameter as a period in which skipping can be performed, in accordance with a value of 0 or 1, of "Minimum applicable scheduling offset indicator" included in the DCI.

2) A corresponding period in which PDCCH monitoring can be skipped, may be predefined by technical specifications, in accordance with a value of 0 or 1, of "Minimum applicable scheduling offset indicator" included in the DCI.

3) The terminal 20 may use a period of an existing parameter as a period in which skipping can be performed. For example, the terminal 20 may use, as a period in which the PDCCH can be skipped, a corresponding value such as a parameter related to DRX, in accordance with a value of 0 or 1, of "Minimum applicable scheduling offset indicator" included in the DCI.

In addition, the period in which PDCCH monitoring can be skipped, may be indicated to the terminal 20, by switching the interpretation of the value included in DCI.

FIG. 6 is a diagram illustrating a second example of the process related to the DCI according to the embodiment of the present invention. In step S31, the terminal 20 determines whether DCI includes scheduling information. If DCI includes scheduling information (YES in S31), the process proceeds to step S32. If DCI does not include scheduling information (NO in S31), the process proceeds to step S33.

In step S32, the terminal 20 identifies the DCI as normal scheduling. In contrast, in step S33, the terminal 20 identifies a specific field in the DCI as a period in which PDCCH monitoring can be skipped. For example, in step S33, the period in which PDCCH monitoring can be skipped may be indicated to the terminal 20 by, for example, "Minimum applicable scheduling offset indicator". Also, the terminal 20 may change the interpretation of a value of $K_0$ that can be read from information included in DCI such that the period in which PDCCH monitoring can be skipped is indicated by the value of $K_0$.

In step S31, when the terminal 20 determines whether DCI includes scheduling information or not, such a determination may be made at the terminal 20, based on one of configuration values that are included in the DCI. For example, when a configuration value for assigning a scheduling frequency is a specific value, it may be determined that DCI does not include scheduling information. The specific value may be a special value that is normally not used.

In step S33, the terminal 20 may recognize that a period in which PDCCH monitoring can be skipped is indicated by "Minimum applicable scheduling offset indicator" included in the DCI that does not include scheduling information.

The terminal 20 may recognize, from one bit value of "Minimum applicable scheduling offset indicator" included in the DCI, that a period in which PDCCH monitoring can be skipped is indicated by a corresponding value, by using a parameter shown by 1) to 4) below.

1) A parameter for indicating a period in which PDCCH monitoring can be skipped may be indicated to the terminal 20 by the base station 10, via the RRC layer, the MAC layer, or the like. For example, one or two parameters are indicated to the terminal 20 via the RRC layer, the MAC layer, or the like, and the terminal 20 may use a corresponding parameter as a period in which skipping can be performed, in accordance with a value of 0 or 1, of "Minimum applicable scheduling offset indicator" included in the DCI.
2) A value configured by the parameter "mininumSchedulingOffset" that is configured for cross slot scheduling, may be used. As in the cross slot scheduling, one or two parameters may be configured, and further, the terminal 20 may use a corresponding configured parameter value as a period in which PDCCH monitoring can be skipped, in accordance with a value of 0 or 1, of "Minimum applicable scheduling offset indicator" included in the DCI.
3) A corresponding period in which PDCCH monitoring can be skipped in accordance with a value of 0 or 1, of "Minimum applicable scheduling offset indicator" included in the DCI, may be predefined by technical specifications.
4) The terminal 20 may use a period of an existing parameter as a period in which skipping can be performed. For example, the terminal 20 may use, as a period in which a PDCCH can be skipped, a corresponding value of a parameter related to DRX, in accordance with a value of 0 or 1, of "Minimum applicable scheduling offset indicator" included in the DCI.

In step S31, when the terminal 20 determines whether DCI includes scheduling information or not, such a determination may be made at the terminal 20, based on one of configuration values that are included in the DCI. For example, when a configuration value for assigning a scheduling frequency is a specific value, it may be determined that DCI does not include scheduling information. The specific value may be a special value that is normally not used.

Figure 7:
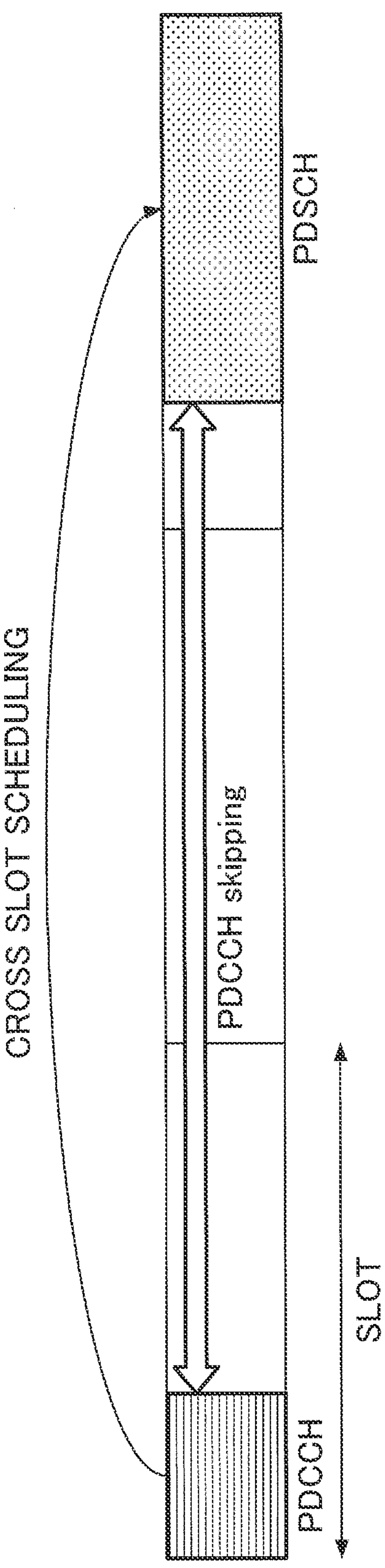
FIG. 7 is a diagram illustrating a second example of the PDCCH monitoring according to the embodiment of the present invention.

FIG. 7 is a diagram illustrating a second example of the PDCCH monitoring according to the embodiment of the present invention. When cross slot scheduling is applied, PDCCH monitoring within an indicated or specified period may be skipped. For example, as illustrated in FIG. 7, when cross slot scheduling is applied, PDCCH scheduling may be skipped from the last symbol or the slot end, of the PDCCH, to a PDSCH symbol or slot that is specified by the cross slot scheduling. A period in which PDCCH monitoring can be skipped may be configured by a slot unit, or may be configured by a symbol unit. For example, when cross slot scheduling is applied, the terminal 20 may skip PDCCH monitoring within a period that is indicated by an upper layer parameter and/or DCI.

"Cross slot scheduling being applied" may mean a case given by 1), 2), or 3) below.

1) A case where at least one configuration parameter "minimumSchedulingOffset" for cross-slot scheduling is configured.
2) A case where all entries available in a time domain resource allocation (TDRA) table indicate cross slot scheduling, in the active BWP.
3) A case where cross slot scheduling is performed via the DCI.

As described in one or more embodiments, the terminal 20 can skip PDCCH monitoring based on, for example, an upper layer parameter and/or DCI.

In other words, power that is consumed by monitoring control signals can be reduced in the wireless communication system.

(Functional Configuration)

Hereafter, an example of the functional configuration of each of the base station 10 and the terminal 20 that performs the process and operation, as described above, will be described. Each of the base station 10 and the terminal 20 includes the function that is implemented in one or more embodiments described above. However, each of the base station 10 and the terminal 20 may include a portion of the function described in one or more embodiments.

<Base Station 10>

Figure 8:
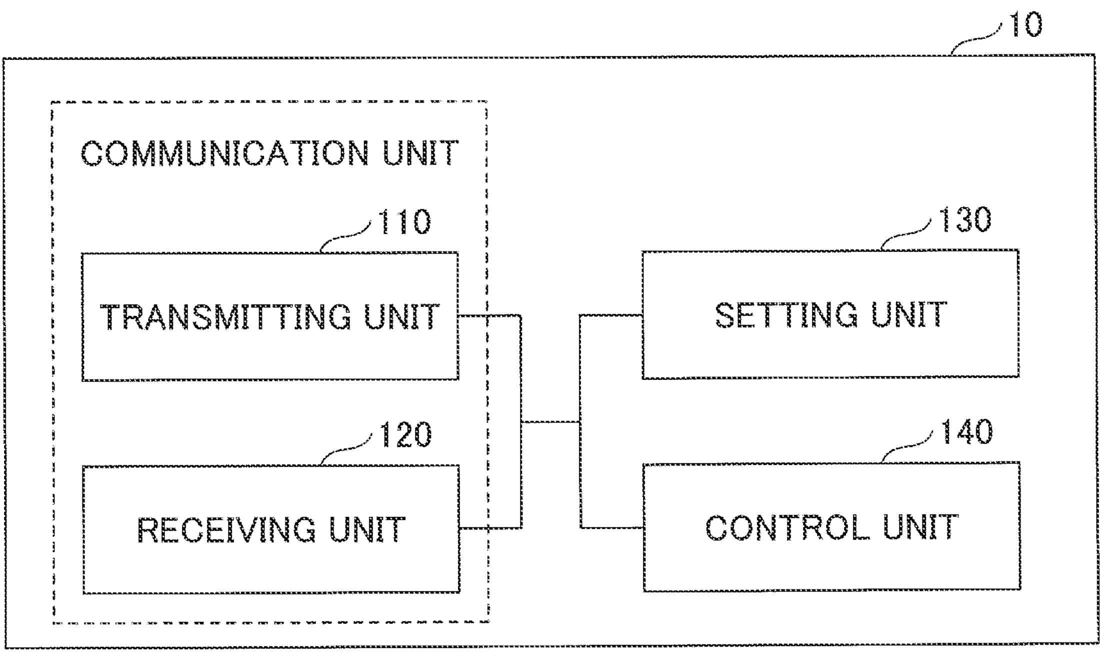
FIG. 8 is a diagram illustrating an example of a functional configuration of a base station 10 according to the embodiment of the present invention.

FIG. 8 is a diagram illustrating an example of the functional configuration of the base station 10. As illustrated in FIG. 8, the base station 10 includes a transmitting unit 110, a receiving unit 120, a setting unit 130, and a control unit 140. The functional configuration illustrated in FIG. 8 is merely one example. Any name may be used for functional sections and functional units as long as operations according to one or more embodiments of the present invention can be performed.

The transmitting unit 110 includes a function of generating signals to be transmitted to the terminal 20, to transmit the signals by wireless. The transmitting unit 110 also transmits a message between network nodes to another network node. The receiving unit 120 includes a function of receiving various types of signals that are transmitted from the terminal 20, to obtain, for example, higher layer information from a received signal. Also, the transmitting unit 110 includes a function of transmitting, to the terminal 20, an NR-PSS, NR-SSS, NR-PBCH, or DL/UL control signal, a reference signal, or the like.

The setting unit 130 stores preset setting information as well as setting information to be transmitted to the terminal 20, in a storage device, and retrieves information from the storage device, as necessary. The content of the setting information includes, for example, information and the like required in DRX and scheduling.

As described in one or more embodiments, the control unit 140 performs controlling related to DRX and scheduling. The transmitting unit 110 includes a functional unit related to transmission of signals at the control unit 140, and the receiving unit 120 may include a functional unit related to reception of signals at the control unit 140, <Terminal 20>

Figure 9:
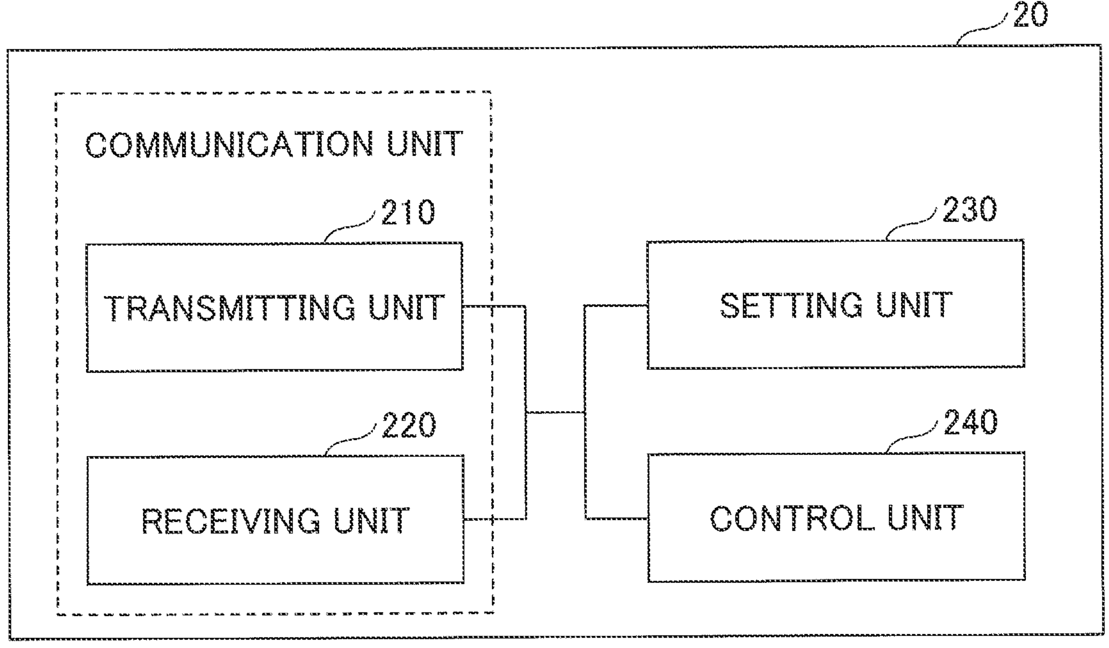
FIG. 9 is a diagram illustrating an example of a functional configuration of a terminal 20 according to the embodiment of the present invention.

FIG. 9 is a diagram illustrating an example of the functional configuration of the terminal 20 according to the embodiment. As illustrated in FIG. 9, the terminal 20 includes a transmitting unit 210, a receiving unit 220, a setting unit 230, and a control unit 240. The functional configuration illustrated in FIG. 9 is merely one example. Any name may be used for functional sections and functional units as long as operations according to one or more embodiments of the present invention can be performed.

The transmitting unit 210 includes a function of generating a transmission signal from transmission data, to transmit the transmission signal by wireless. The receiving unit 220 receives various signals by wireless, and obtains a higher layer signal, from a received physical layer signal. The receiving unit 220 also has a function of receiving an NR-PSS, NR-SSS, NR-PBCH, or DL/UL/SL control signals, or the like, which is transmitted from the base station 10. For example, for D2D communication, the transmitting unit 210 transmits, to another terminal 20, a physical sidelink control channel (PSCCH), a physical sidelink shared channel (PSSCH), a physical sidelink discovery channel (PSDCH), a physical sidelink broadcast channel (PSBCH), or the like. The receiving unit 220 receives, from another terminal 20, the PSCCH, the PSSCH, the PSDCH, the PSBCH, or the like. A combination of the transmitting unit 210 and the receiving unit 220 may constitute a communication unit.

The setting unit 230 stores, in a storage device, various setting information that is received from the base station 10 or the terminal 20, through the receiving unit 220, and retrieves information from the storage device, as necessary. The setting unit 230 also stores preset setting information. The content of the setting information includes, for example, information and the like required in DRX and PDCCH monitoring.

As described in one or more embodiments, the control unit 240 controls monitoring of the DRX and PDCCH. The transmitting unit 210 includes a functional unit related to transmission of signals at the control unit 240, and the receiving unit 220 may include a functional unit related to reception of signals at the control unit 240.

(Hardware Configuration)

In the block diagrams (FIGS. 8 and 9) described in one or more embodiments, the functional blocks representing the functional units are illustrated. The functional blocks (configuring units) are implemented by any combination of at least one of hardware and software. A method of implementing each functional block is not particularly limited. In other words, each functional block may be implemented by one device that is physically or logically coupled, or may be implemented by using a plurality of devices being two or more devices that are physically or logically separated and that are directly or indirectly connected (for example, by wired, wireless, or the like). The function block may be realized by combining software with the one device or the plurality of devices.

The functions include determining, deciding, judging, computing, calculating, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuring unit) that causes transmission to function is referred to as a transmitting unit or a transmitter. In any case, as described above, an implementation method is not particularly limited.

Figure 10:
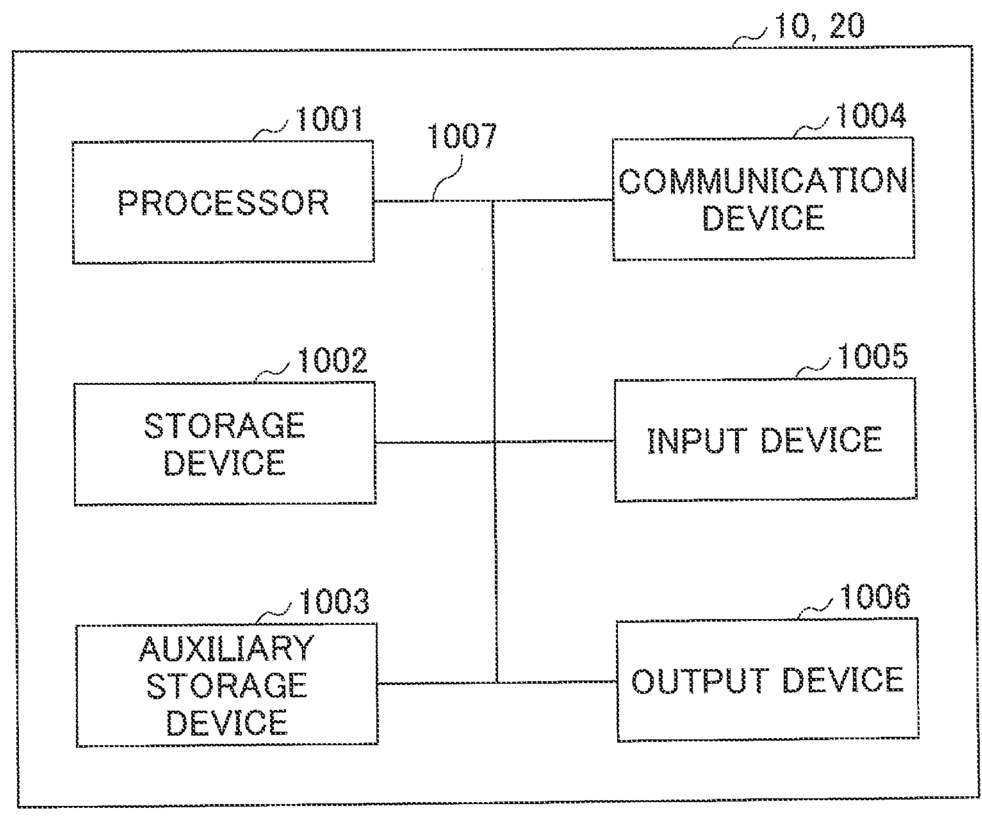
FIG. 10 is a diagram illustrating an example of a hardware configuration of each of the base station 10 and the terminal 20 according to the embodiment of the present invention.

For example, each of the base station 10, the terminal 20, and the like according to one embodiment of the present disclosure may function as a computer for processing a wireless communication method in the present disclosure. FIG. 10 is a diagram illustrating an example of the hardware configuration of each of the base station 10 and the terminal 20 according to one embodiment of the present disclosure. Each of the base station 10 and the terminal 20 may be physically configured as a computer device including a processor 1001, a storage device 1002, an auxiliary storage device 1003, a communication device 1004, an input device 1005, an output device 1006, a bus 1007, and the like.

Note that in the following description, the term "device" can be replaced with a circuit, a device, a unit, or the like. The hardware configuration of each of the base station 10 and the terminal 20 may be configured to include one or more devices illustrated in the drawings, or may be configured without including some devices.

Each function of the base station 10 and the terminal 20 is implemented such that predetermined software (program) is read by hardware such as the processor 1001 and the storage device 1002 and such that the processor 1001 performs an operation to control communication by the communication device 1004, or, controls at least one of reading and writing of data in the storage device 1002 and the auxiliary storage device 1003.

For example, the processor 1001 executes an operating system and controls the entire computer. The processor 1001 may be configured with a central processing unit (CPU) including an interface with a peripheral device; a control device; an arithmetic device, a register, and the like. For example, the control unit 140, the control unit 240, and the like described above may be implemented by the processor 1001.

Further, the processor 1001 reads a program (program code), a software module, data, or the like from at least one of the auxiliary storage device 1003 and the communication device 1004, to the storage device 1002, and executes various types of processes according to them. A program that causes a computer to execute at least a portion of the operation described in the above embodiment is used as the program. For example, the control unit 140 of the base station 10 illustrated in FIG. 8 may be implemented by a control program that is stored in the storage device 1002 and that is executed by the processor 1001. Further, for example, the control unit 240 of the terminal 20 illustrated in FIG. 9 may be implemented by a control program that is stored in the storage device 1002 and that is executed by the processor 1001. Various types of processes have been described using one processor 1001, but may be performed simultaneously or sequentially by two or more processors 1001. The processor 1001 may be implemented by one or more chips. Note that the program may be transmitted from a network via an electric communication line.

The storage device 1002 is a computer readable recording medium and may be configured by at least one among a read only memory (ROM), an erasable programmable ROM (EPROM), an electrically erasable programmable ROM (EEPROM), a random access memory (RAM), and the like. The storage device 1002 may be also referred to as a register, a cache, a main memory (main storage device), or the like. The storage device 1002 can store programs (program codes), software modules, or the like that are executable for carrying out the communication method according to one embodiment of the present disclosure.

The auxiliary storage device 1003 is a computer-readable recording medium and may be configured by, for example, at least one among an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage medium may be a database, a server, or any other appropriate medium, which includes, for example, at least one of the storage device 1002 and the auxiliary storage device 1003.

The communication device 1004 is hardware (a transceiving device) for performing communication between computers via at least one of a wired network and a wireless network, and is also referred to as, for example, a network device, a network controller, a network card, a communication module, or the like. The communication device 1004 may include a high-frequency switch, a duplexer, a filter, a frequency synthesizer, or the like in order to implement at least one of frequency division duplex (FDD) and time division duplex (TDD). For example, a transceiving antenna, an amplifying unit, a transmitting and receiving unit, a transmission line interface, or the like may be implemented by the communication device 1004. The transmitting and receiving unit may be implemented by a transmitting unit and a receiving to thereby be physically or logically separated.

The input device 1005 is an input device that receives an input from the outside (such as a keyboard, a mouse, a microphone, a switch, a button, a sensor, or the like). The output device 1006 is an output device that performs output to the outside (for example, a display, a speaker, an LED lamp, or the like). Note that the input device 1005 and the output device 1006 may be integrally configured (for example, a touch panel).

The devices such as the processor 1001 and the storage device 1002 are connected together via the bus 1007 for communicating information. The bus 1007 may be configured with a single bus or may be configured with a different bus for each device.

Further, each of the base station 10 and the terminal 20 may be configured to include hardware such as a microprocessor, a digital signal processor (DSP), an application specific integrated circuit (ASIC), a programmable logic device (PLD), or a field programmable gate array (FPGA), or, all or some of the functional blocks may be implemented by hardware. For example, the processor 1001 may be implemented using at least one of these pieces of hardware.

SUMMARY OF EMBODIMENTS

As described above, according to one or more embodiments of the present invention, a terminal is provided. The terminal includes a receiving unit configured to receive a signal in a physical layer from a base station, the signal including information related to monitoring of a control channel. The terminal includes a control unit configured to monitor the control channel transmitted from the base station. The control unit is configured to configure a period in which the control channel is not monitored, based on the information.

In such a configuration, the terminal 20 can skip PDCCH monitoring based on, for example, an upper layer parameter and/or DCI. In other words, power that is consumed through monitoring of a control signal can be reduced in a wireless communication system.

The control unit may be configured to configure the period in which the control channel is not monitored in a case where the signal in the physical layer does not include scheduling information. In such a configuration, the terminal 20 can skip PDCCH monitoring based on, for example, an upper layer parameter and/or DCI, through efficient signaling.

The information corresponds to a field indicating a minimum offset to be applied to cross slot scheduling, and the control unit may be configured to configure the period in which the control channel is not monitored, by switching an interpretation of the field, in a case where the signal in the physical layer does not include the scheduling information. In such a configuration, the terminal 20 can skip PDCCH monitoring based on, for example, an upper layer parameter and/or DCI, through efficient signaling.

The information corresponds to a field indicating a minimum offset to be applied to cross slot scheduling, and the receiving unit is configured to receive a signal in an upper layer from the base station. The control unit may be configured to configure the period in which the control channel is not monitored, by switching the interpretation of the field, in a case where a parameter to be used for the cross slot scheduling is not configured in the signal in the upper layer. In such a configuration, the terminal 20 can skip PDCCH monitoring based on, for example, an upper layer parameter and/or DCI, through efficient signaling.

The control unit may be configured to configure the period in which the control channel is not monitored, based on the information in a case where the cross slot scheduling is to be applied. In such a configuration, the terminal 20 can skip PDCCH monitoring based on, for example, an upper layer parameter and/or DCI, through efficient signaling.

A communication method executed by a terminal is provided. The communication method includes receiving a signal in a physical layer from a base station, the signal including information related to monitoring of a control channel. The communication method includes monitoring the control channel that is transmitted from the base station. The monitoring includes configuring a period in which the control channel is not monitored, based on the information.

In such a method, the terminal 20 can skip PDCCH monitoring based on, for example, an upper layer parameter and/or DCI. In other words, power that is consumed through monitoring of a control signal can be reduced in a wireless communication system.

Supplement to Embodiment

The one or more embodiments of the present invention has been described above, but the disclosed invention is not limited to the above embodiments, and those skilled in the art would understand that various modified examples, revised examples, alternative examples, substitution examples, and the like can be made. In order to facilitate understanding of the present invention, examples of specific numerical values are used for description, but the numerical values are merely examples, and any suitable values may be used unless otherwise stated. The classification of items in the above description is not essential to the present invention, and thus matters described in two or more items may be combined and used as necessary, or a matter described in one item may be applied to a matter described in another item (unless there is a contradiction). The boundary between functional units or processing units in a functional block diagram does not necessarily correspond to the boundary between physical parts. The operations of a plurality of functional units may be performed physically by one component, or an operation of one functional unit may be performed physically by a plurality of parts. In the processing procedures described in the one or more embodiments, the order of processes may be changed as long as there is no inconsistency. For the sake of convenience of the process description, the base station 10 and the terminal 20 have been described using the functional block diagrams, but such apparatuses may be implemented by hardware, software, or a combination thereof. The software executed by the processor of the base station 10 according to one or more embodiments of the present invention, as well as the software executed by the processor of the terminal 20 according to one or more embodiments of the present invention, may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

The notification of information is not limited to the aspect/embodiment described in the present disclosure, but may be performed by other methods. For example, the notification of information may be performed by physical layer signaling (for example, downlink control information (DCI), uplink control information (UCI), higher layer signaling (for example, radio resource control (RRC) signaling, medium access control (MAC) signaling, broadcast information (master information block (MIB), system information block (SIB)), other signals, or combinations thereof. The RRC signaling may be referred to as an RRC message and may be, for example, an RRC connection setup message, an RRC connection reconfiguration message, or the like.

Each aspect/embodiment described in the present disclosure may be applied to at least one from among LTE (Long Term Evolution), LTE-A (LTE-Advanced), SUPER 3G, IMT-advanced, 4G (4th generation mobile communication system), 5G (5th generation mobile communication system), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideBand (UWB), Bluetooth (registered trademark), a system using other proper system, and next-generation systems that are extended based on these systems. Also, a combination of multiple systems (for example, a combination or the like of at least one of LTE and LTE-A, and 5G) may be applied.

In each aspect/embodiment described in the specification, the order of the procedure, the sequence, the flowchart, and the like may be changed as long as there is no contraction therebetween. For example, for the method described in the present disclosure, elements of various steps are presented in the illustrative order and are not limited to the specific order as presented.

In the specification, in some cases, the specific operation performed by the base station 10 may be also performed by an upper node of the base station apparatus. In a network that includes one or more network nodes including the base station 10, it is apparent that various operations performed for communication with the terminal 20 are performed by at least one from among the base station 10 and another network node (for example, MME, S-GW, or the like is considered, but such a node is not limited thereto) other than the base station 10. In the above example, one network node is used as another network node other than the base station 10. However, a plurality of other network nodes (for example, MME and S-GW) may be combined.

The information, the signal, or the like described in the present disclosure may be output from an upper layer (or a lower layer) to a lower layer (or an upper layer). The information, the signal, or the like described in the present disclosure may be input and output via a plurality of network nodes.

Input and output information, and the like may be stored in a specific place (for example, a memory), or may be managed using a management table. Input and output information, and the like may be overwritten, updated, or additionally written. Output information, and the like may be deleted. Input information, and the like may be transmitted to another device.

The determination in the present disclosure may be performed in accordance with a value (0 or 1) expressed by one bit, be performed with a Boolean value (true or false), or be performed based on a comparison between numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is referred to as software, firmware, middleware, a microcode, a hardware description language, or, is referred to by any other name.

Further, software, commands, information, and the like may be transmitted and received via a transmission medium. For example, when software is transmitted from a web site, a server, or any other remote source, by using at least one among a wired technology (such as a coaxial cable, a fiber optic cable, a twisted pair, or a digital subscriber line (DSL)) and a radio technology (such as infrared rays or a microwave), at least one of the wired technology and the radio technology is defined in the transmission medium.

Information, signals, and the like described in the present disclosure may be expressed using any of a variety of different techniques. For example, data, instructions, commands, information, signals, bits, symbols, chips, and the like which are mentioned throughout the description may be expressed by voltages, currents, electromagnetic waves, magnetic particles, optical fields, photons, or any combination thereof.

Note that the terms described in the present disclosure and terms necessary for understanding the present disclosure may be replaced with terms having the same or similar meanings. For example, at least one of a channel and a symbol may be a signal (signaling). Further, a signal may be a message. Further, a component carrier (CC) may be referred to as a carrier frequency, a cell, a frequency carrier, or the like.

The terms "system" and "network" used in the present disclosure are used interchangeably.

Further, information, parameters, and the like described in the present disclosure may be expressed using an absolute value, be expressed using a relative value from a predetermined value, or be expressed using corresponding other information. For example, the radio resource may be indicated by an index.

The names used for the above parameters are not limited in any respect. Further, mathematical formulas or the like using the parameters may be different from those explicitly disclosed in the present disclosure. Since various channels (for example, a PUCCH, a PDCCH, and the like) and information elements can be identified by any suitable names, various names for the various channels, as well as and the information elements, are not limited in any respect.

In the present disclosure, the terms "base station (BS)", "radio base station", "base station apparatus", "fixed station", "Node B", "eNode B (eNB)", "gNodeB (gNB)", "access point", "transmission point", "reception point", "transmission/reception point", "cell", "sector", "cell group", "carrier", "component carrier", and the like may be used interchangeably. The base station may also be referred to by the term such as a macrocell, a small cell, a femtocell, or a picocell.

The base station can accommodate one or more (for example, three) cells. In a case in which the base station accommodates a plurality of cells, the entire coverage area of the base station can be partitioned into a plurality of smaller areas, and each smaller area can provide a communication service through a base station subsystem (for example, a small indoor base station (Remote Radio Head (RRH)). The term “cell” or “sector” refers to all or some of the coverage area of at least one of the base station and the base station subsystem that provide a communication service in the coverage.

In the present disclosure, the terms “mobile station (MS)”, “user terminal”, “user equipment (UE)”, “terminal”, and the like may be used interchangeably.

The mobile station may be also referred to as, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or client, or may be also referred to by some other suitable terms.

At least one of the base station and the mobile station may be also referred to as a transmitting device, a receiving device, a communication device, or the like. Note that at least one of the base station and the mobile station may include a device installed in a mobile body, a mobile body itself, or the like. The mobile body may be a vehicle (for example, a car, an airplane, or the like), a moving body that moves unmanned (for example, a drone, an autonomous car or the like), or a robot (manned type or unmanned type). Note that at least one of the base station and the mobile station includes a device that does not necessarily move during a communication operation. For example, at least one of the base station and the mobile station may be an IoT (Internet of things) device such as a sensor.

Further, the base station in the present disclosure may be replaced with a user terminal. For example, in each aspect/embodiment of the present disclosure, a configuration in which communication between the base station and the user terminal is replaced with communication between a plurality of terminals 20 (for example, which may be referred to as device-to-device (D2D), vehicle-to-everything (V2X), or the like)) may be applied. In this case, the terminal 20 may have the function of the base station 10 described above. Further, the terms such as “uplink” and “downlink” may be each replaced with a term (for example, “side”) corresponding to inter-terminal communication. For example, an uplink channel, a downlink channel, or the like may be replaced with a side channel.

Likewise, the user terminal in the present disclosure may be replaced with the base station. In this case, the base station may have the function of the above user terminal.

The term “determining” used in the present disclosure may cover a wide variety of actions. For example, “determining” may include, for example, events or the like in which events such as judging, calculating, computing, processing, deriving, investigating, looking up, search, and inquiry (for example, search using a table, a database, or another data structure), or ascertaining are regarded as “determining”. Further, “determining” may include, for example, events or the like in which events such as receiving (for example, receiving information), transmitting (for example, transmitting information), input, output, or accessing (for example, accessing data in a memory) are regarded as “determining”. Further, “determining” may include, for example, events in which events such as resolving, selecting, choosing, establishing, or comparing, etc. are regarded as “determining”. In other words, “determining” may include events in which any operation is regarded as “determining”. Further, “determining” may be replaced with “assuming”, “expecting”, “considering”, or the like.

The term “connected” or “coupled”, or any modification thereof means any direct or indirect connection or coupling between two or more elements, and can cover the presence of one or more intermediate elements between two elements that are “connected” or “coupled” with each other. The coupling or the connection between the elements may be physical, logical, or a combination thereof. For example, “connection” may be replaced with “access”. When used in the present disclosure, two elements can be considered to be “connected” or “coupled” with each other, by using at least one among one or more electric wires, cables, and printed electrical connection, or, by using, as a non-limiting and non-exhaustive example, electromagnetic energy or the like with a wavelength in radio frequency domain, a microwave region, and a light (both visible and invisible) region.

A reference signal may be abbreviated as a reference signal (RS), and may be referred to as a pilot, depending on an applied standard.

A phrase “based on” used in the present disclosure is not limited to “based on only” unless otherwise stated. In other words, the phrase “based on” means both of “based on only” and “based on at least”.

Any reference to an element expressed using a designation such as “first”, “second”, or the like used in the present disclosure does not generally restrict quantities or an order of those elements. Such designations may be used in the present disclosure as a convenient method of distinguishing two or more elements. Thus, reference to the first and second elements does not mean that only two elements can be adopted, or that the first element must precede the second element in a certain form.

Further, “means” in the configuration of each of the above apparatuses may be replaced with “unit”, “circuit”, “device”, or the like.

In the present disclosure, when “include”, “including”, and variations thereof are used, these terms are intended to be comprehensive, similarly to a term “equipped with (comprising)”. Further, the term “or” used in the present disclosure is intended not to be an exclusive disjunction.

A radio frame may include one or more frames in the time domain. In the time domain, each of one or more frames may be referred to as a subframe. The subframe may further include one or more slots in the time domain. The subframe may have a fixed time length (for example, 1 ms) that is not in accordance with numerology.

The numerology may be a communication parameter applied to at least one of transmission and reception of a certain signal or channel. The numerology may indicate at least one from among, for example, subcarrier spacing (SCS), a bandwidth, a symbol length, a cyclic prefix length, a transmission time interval (TTI), the number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA)

symbols, or the like) in the time domain. The slot may be a time unit based on the numerology.

The slot may include a plurality of mini-slots. Each mini-slot may include one or more symbols in the time domain. The mini-slot may be referred to as a sub-slot. The mini-slot may include a number of symbols smaller than a slot. The PDSCH (or PUSCH) transmitted by time unit greater than the mini-slot may be referred to as the PDSCH (or PUSCH) mapping type A. The PDSCH (or PUSCH) transmitted using the mini-slot may be referred to as the PDSCH (or PUSCH) mapping type B.

A radio frame, a subframe, a slot, a mini-slot, and a symbol each indicate a time unit used in transmitting a signal. The radio frame, the subframe, the slot, the mini-slot, and the symbol may be each referred to by a corresponding other name.

For example, one subframe may be referred to as a transmission time interval (TTI), a plurality of consecutive subframes may be referred to as a TTI, or one slot or one mini-slot may be referred to as a TTI. In other words, at least one of the subframe and the TTI may be a subframe (1 ms) in existing LTE, include a period (for example, 1 to 13 symbols) shorter than 1 ms, or include a period longer than 1 ms. Note that a unit expressed as the TTI may be referred to as a slot, a mini-slot, or the like, instead of the subframe.

Here, for example, the TTI refers to a minimum time unit for scheduling in wireless communication. For example, in an LTE system, the base station performs scheduling in which a radio resource (a frequency bandwidth, a transmission power, or the like that can be used for each terminal 20) is allocated to each terminal 20, by a TTI unit. Note that the definition of the TTI is not limited to the above manner.

The TTI may be used as a transmission time unit for a channel coded data packet (transport block), a code block, a code word, or the like, or may be used as a processing unit for scheduling, link adaptation, or the like. Note that when a TTI is given, a time interval (for example, the number of symbols) at which a transport block, a code block, a code word, or the like is actually mapped may be shorter than the TTI.

Note that when one slot or one mini-slot is referred to as the TTI, one or more TTIs (that is, one or more slots, or, one or more mini-slots) may be used as a minimum time unit for scheduling. Further, the number of slots (the number of mini-slots) that constitute the minimum time unit for scheduling may be controlled.

A TTI having a time length of 1 ms may be referred to as a common TTI (TTI in LTE Rel. 8-12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini-slot, a sub-slot, a slot, or the like.

Note that the long TTI (for example, a common TTI, a subframe, or the like) may be replaced with a TTI having a time length exceeding 1 ms, and the short TTI (for example, a reduced TTI, or the like) may be replaced with a TTI having a TTI length that is shorter than a TTI length of the long TTI, and that is equal to or longer than 1 ms.

The resource block (RB) is used as a resource allocation unit in the time domain and frequency domain, and may include one or more consecutive subcarriers in the frequency domain. The number of subcarriers included in the RB may be same, regardless of a numerology, and be, for example, 12. The number of subcarriers included in the RB may be determined based on the numerology.

Further, a time domain of the RB may include one or more symbols, and may have a length of one slot, one mini-slot, one subframe, or one TTI. One TTI, one subframe, or the like may be configured with one or more resource blocks.

Note that one or more RBs may be referred to as a physical resource block (PRB), a sub-carrier group (SCG), a resource element group (REG), a PRB pair, an RB pair, or the like.

Further, the resource block may be configured with one or more resource elements (REs). For example, one RE may be a radio resource domain of one subcarrier and one symbol.

Bandwidth part (BWP) (which may be referred to as a partial bandwidth, or the like) may indicate a subset of consecutive common resource blocks (RBs) for certain numerology, on a certain carrier. Where, the common RB may be specified by an RB index with reference to a common reference point in a given carrier. The PRB is defined by a certain BWP, and may be numbered in the BWP.

The BWP may include a BWP (UL BWP) for UL and a BWP (DL BWP) for DL. For UE, one or more BWPs may be configured in one carrier.

At least one of configured BWPs may be active, and UE may not be assumed to transmit and receive a predetermined signal/channel, except for the active BWP. Note that the "cell", the "carrier", or the like in the present disclosure may be replaced with the "BWP".

The structures of the above radio frame, the subframe, the slot, the mini-slot, the symbol, and the like are merely examples. For example, the configurations, such as the number of subframes included in a radio frame, the number of slots per subframe or radio frame, the number of mini-slots included in a slot, the number of each of symbols and RBs, the symbols included in a slot or a mini-slot, the number of sub-carriers included in an RB, the number of symbols in a TTI, a symbol length, a cyclic prefix (CP) length, and the like, can be variously changed.

In the present disclosure, for example, when an article such as "a", "an", or "the" in English is added by translating, the present disclosure may include a case in which a noun following the article is in the plural.

In the present disclosure, the expression "A and B are different" may mean "A and B are different from each other." Note that the expression may mean "each of A and B is different from C". Terms such as "separated", "coupled", or the like may be also interpreted, as is the case with "different".

Each aspect/embodiment described in the present disclosure may be used alone or in combination, or be switched according to the execution. Further, notification of predetermined information (for example, notification of "being X") is not limited to being performed explicitly, and may be performed implicitly (for example, the predetermined information is not indicated).

Note that in the present disclosure, the PDCCH is an example of a control channel. The DCI is an example of a signal at a physical layer. A parameter at an RRC layer is an example of a signal at an upper layer.

The present disclosure has been described above. It would be apparent to those skilled in the art that the present disclosure is not limited to the one or more embodiments described in the present disclosure, Modifications and changes to the present disclosure can be made without departing from a spirit and scope of the present disclosure set forth in the claims. Therefore, the description of the present disclosure is provided for illustrative purposes, and is not intended to limit the present disclosure.

REFERENCE SIGNS LIST

10 BASE STATION
110 TRANSMITTING UNIT
120 RECEIVING UNIT
130 SETTING UNIT
140 CONTROL UNIT
20 TERMINAL
210 TRANSMITTING UNIT
220 RECEIVING UNIT
230 SETTING UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:

a receiver configured to receive an upper layer parameter related to downlink control channel monitoring and downlink control information from a base station; and a processor configured to configure a period for skipping monitoring of a downlink control channel transmitted from the base station, based on the upper layer parameter and a field included in the downlink control information, wherein the processor selects, based on the field, one of a plurality of periods configured based on the upper layer parameter as the period for skipping the monitoring of the downlink control channel transmitted from the base station, wherein the monitoring of the downlink control channel corresponds to both a Random access-Radio network temporary identifier (RA-RNTI) and a Cell-Radio network temporary identifier (C-RNTI), and wherein even in response to the processor being configured to configure the period for skipping monitoring of the downlink control channel, the processor does not skip monitoring of the downlink control channel transmitted from the base station when the RA-RNTI is applied to the downlink control channel, and wherein in response to the processor being configured to configure the period for skipping monitoring of the downlink control channel, the processor skips monitoring of the downlink control channel transmitted from the base station when the C-RNTI is applied to the downlink control channel.

* * * * *